United States Patent
Haartsen

(10) Patent No.: US 6,912,249 B2
(45) Date of Patent: Jun. 28, 2005

(54) METHOD AND SYSTEM FOR TRAINING A RADIO RECEIVER

(75) Inventor: Jacobus Haartsen, Hardenberg (NL)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 678 days.

(21) Appl. No.: 09/808,770

(22) Filed: Mar. 15, 2001

(65) Prior Publication Data

US 2002/0131486 A1 Sep. 19, 2002

(51) Int. Cl.$^7$ ................................................. H03H 7/40
(52) U.S. Cl. ....................... 375/231; 375/296; 375/348; 455/63; 455/67.3; 329/316; 329/348; 332/108; 332/119; 332/151
(58) Field of Search ................................. 375/229, 231, 375/232, 295, 296, 348, 350, 354; 455/63, 65, 67.3, 102, 296; 329/316, 348; 332/108, 119, 151

(56) References Cited

U.S. PATENT DOCUMENTS

| | | | |
|---|---|---|---|
| 4,468,786 A | 8/1984 | Davis | |
| 4,873,683 A | 10/1989 | Borth et al. | |
| 5,263,026 A | 11/1993 | Parr et al. | |
| 5,373,507 A | 12/1994 | Sköld | |
| 5,384,791 A | 1/1995 | Klein | |
| 5,481,565 A | 1/1996 | Pal | |
| 5,483,557 A | 1/1996 | Webb | |
| 5,524,124 A | 6/1996 | Koenig | |
| 5,537,398 A * | 7/1996 | Siwiak | 370/204 |
| 5,577,068 A | 11/1996 | Bottomley et al. | |
| 5,909,469 A | 6/1999 | Frodigh et al. | |
| 5,926,746 A | 7/1999 | Morley | |
| 5,978,361 A | 11/1999 | Kokudo | |
| 5,995,499 A | 11/1999 | Hottinen et al. | |
| 6,061,549 A | 5/2000 | Labonte et al. | |
| 6,101,219 A | 8/2000 | Perez Abadia et al. | |
| 6,118,812 A | 9/2000 | Dagdeviren | |
| 6,169,761 B1 | 1/2001 | Marcoccia et al. | |
| 6,185,251 B1 | 2/2001 | Fertner | |
| 6,407,993 B1 * | 6/2002 | Moulsley | 370/347 |
| 6,693,566 B2 * | 2/2004 | Jaffe et al. | 341/50 |

FOREIGN PATENT DOCUMENTS

| | | |
|---|---|---|
| EP | 0 615 352 A | 9/1994 |
| EP | 1 073 302 A | 1/2001 |
| WO | 00/05844 A | 2/2000 |
| WO | 00/56928 A | 9/2000 |

OTHER PUBLICATIONS

Zhang et al., "A Performance Analysis and Design of Equalization with Pilot Aided Channel Estimation" IEEE Vehicular Technology Conference, May 4–7, 1997, pp. 720–724, New York, USA.

U.S. Provisional Application entitled "Selective–Repeat Automatic Retransmission Query (ARQ) Protocol and/or Ping Pong Protocol" filed Feb. 3, 2001.

* cited by examiner

Primary Examiner—Dac V. Ha
(74) Attorney, Agent, or Firm—Potomac Patent Group PLLC

(57) ABSTRACT

A system and method for training a radio receiver to mitigate the effects of ISI caused by multi-path includes receiving a header of a transmitted packet at the receiver, the header containing at least one flag to identify a corresponding reference training sequence to be selected by the receiver and to indicate whether a training sequence is inserted in a packet. The receiver decodes the header to determine whether a training sequence is indicated by the flag and to select the corresponding reference training sequence. The training sequence is transmitted positioned within a data packet at a midamble between the header and a first segment of the data packet. The received training sequence is compared with the selected reference training sequence and the equalization parameters of the receiver are adjusted based on the results of the comparison. The selected reference training sequence corresponds to the modulation scheme applied to the payload.

22 Claims, 9 Drawing Sheets

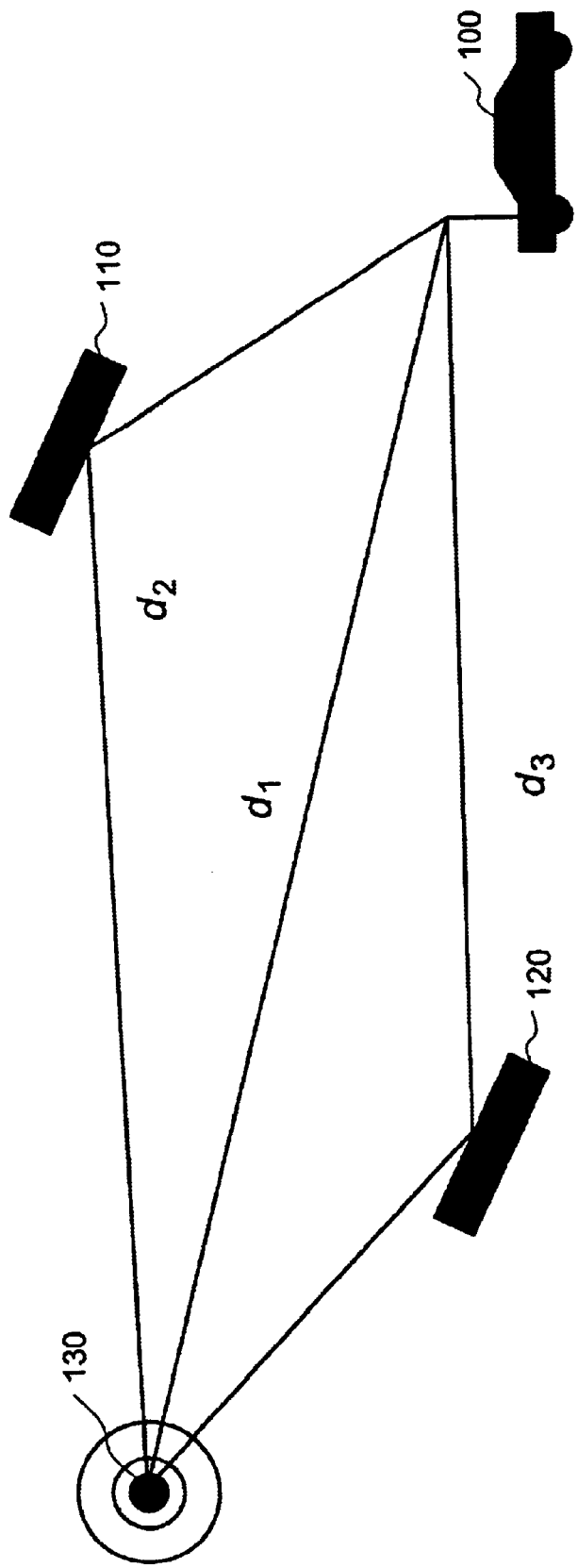

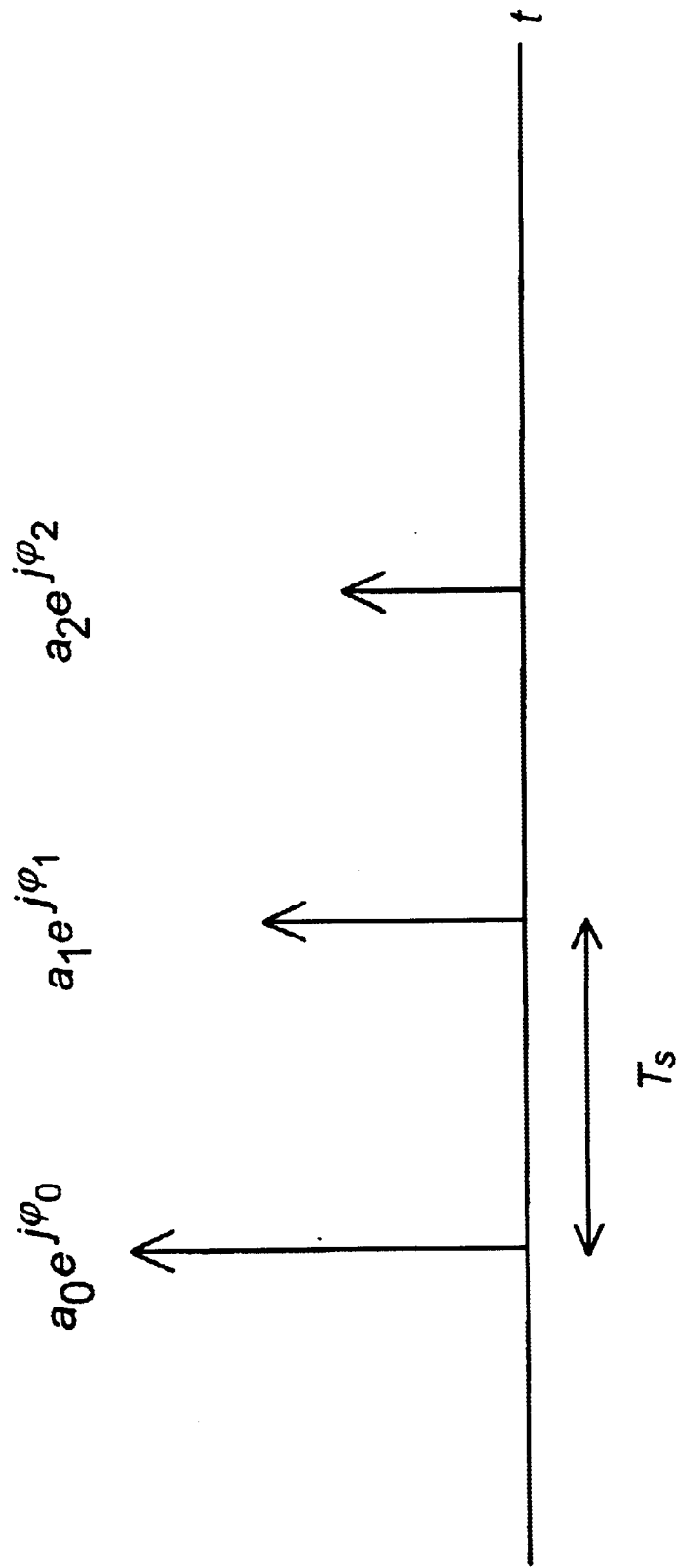

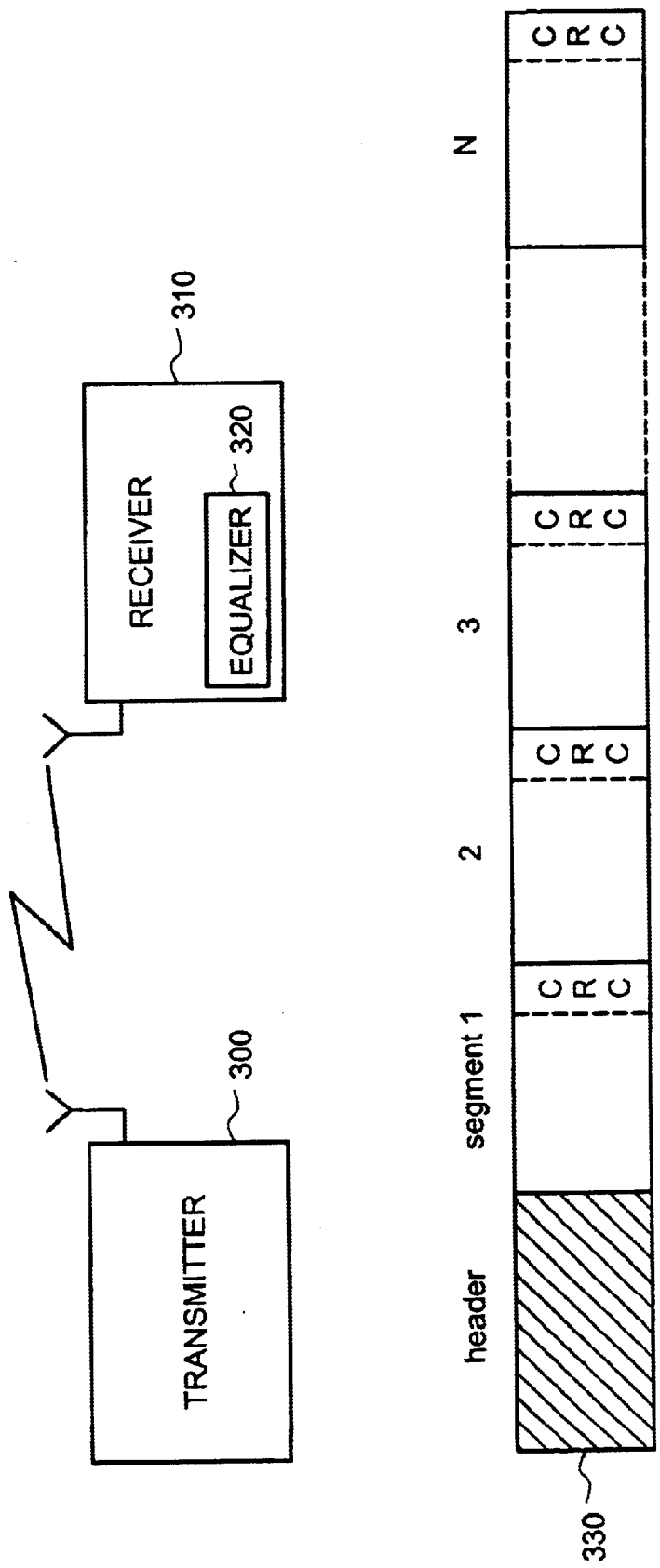

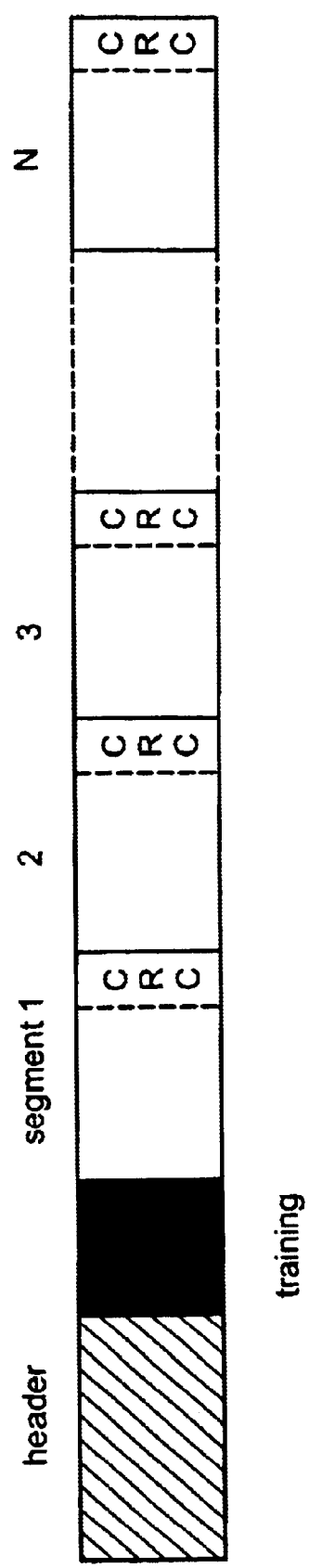

METHOD AND SYSTEM FOR TRAINING A RADIO RECEIVER

BACKGROUND

This invention relates to radio communications in a receiver and more particularly to a method and system for training an equalizer in a radio receiver.

In recent years, wireless communication systems have been used to convey a variety of information between multiple locations. With digital communications, information is translated into a digital or binary form, referred to as bits, for communications purposes. The transmitter maps this bit stream into a modulated symbol stream, which is detected at the digital receiver and mapped back into bits and information.

In digital wireless communication, the radio environment presents many difficulties that impede successful communication. One difficulty is that the signal level can fade, because the signal may travel in multiple paths due to reflections caused by various objects. As a result, signal images arrive at the receiver antenna out of phase. This type of fading is commonly referred to as Rayleigh fading, fast fading, or multi-path fading. When the signal fades, the signal-to-noise ratio becomes lower, causing a degradation in the communication link quality.

Raleigh fading can be mitigated by using diversity, such as antenna diversity, at the receiver. The signal is received on a plurality of antennas. Because the antennas have slightly different locations and/or antenna patterns, the fading levels on the antennas are different. In the receiver, these multiple antenna signals are combined either before or after signal detection using such techniques as maximal-ratio-combining, equal-gain-combining, and selective combining. Diversity combining techniques are well known to those skilled in the art.

A second problem occurs when the multiple signal paths are much different in length. In this case, time dispersion occurs in which multiple fading signal images arrive at the receiver antenna at different times, giving rise to signal echoes. Between the multiple signals images, the echoes of one symbol interfere with subsequent symbols, causing inter-symbol interference (ISI). As a result of ISI, the bit error rate (BER) of the bit stream cannot be improved below an error floor, also known as the irreducible BER.

Time dispersion affects are further complicated by the presence of multiple frequency components within the message bandwidth. As the frequency differential between frequency components increases, the multi-path signal paths will affect the amplitude and phase of each component differently. As a result, one frequency component may suffer a severe fade while the other frequency component's fade occurs at a different time. This is known as frequency-selective fading.

Interference caused by time dispersion can be mitigated by using an equalizer. In one approach, commonly referred to as adaptive equalization, the equalizer's coefficients are continually and automatically adjusted directly from the transmitted data. A drawback of adaptive equalization is the computational burden involved, since the equalizer must continually update the filter coefficients so that the channel model is adapted to the current conditions of the channel. Equalizer coefficient computational methods employing adaptive algorithms such as the least mean square (LMS) or recursive least square (RLS) are computationally expensive. Communication systems using a high data rate require a very high sampling rate and continual LMS updating of the equalizer filter coefficients, which requires extensive computations.

Common forms of equalization are provided by linear equalizers, decision-feedback equalizers, and maximum-likelihood sequence-estimation (MLSE) equalizers. A linear equalizer compensates for interference in the channel by filtering the received signal. A decision-feedback equalizer exploits previous symbol detections to compensate for the ISI from echoes of these previous symbols. Finally, an MLSE equalizer hypothesizes various transmitted symbol sequences and, with a model of the dispersive channel, determines which hypothesis best fits the received data. Equalization techniques are discussed in further detail in U.S. Pat. No. 5,577,068, which is incorporated by reference.

Radio receivers may use training sequences to adjust equalizer coefficients to compensate for frequency-selective fading. Training sequences are symbol sequences which are inserted by a transmitter at known positions in the transmit symbol stream. The receiver compares a received training sequence with a locally-generated or otherwise known reference training sequence. The reference training sequence used by the receiver is the inserted training sequence prior to experiencing the multi-path channel effects. The receiver determines the differences between the two sequences and uses the determined differences to set the equalizer filter coefficients, since the determined differences correspond to the characteristics of the channel, i.e., the delays and magnitudes of the most prominent echoes.

In practice, different modulation schemes require different training sequences. Preferably, a training sequence is modulated using the same modulation scheme as is used for the information stream to which the equalization is to be applied.

Additional complications arise in communication systems employing dynamic link adaptation. Dynamic link adaptation is a communication method in which the modulation scheme is changed in response to the current link condition. A more robust modulation scheme is employed as needed to compensate for degraded link performance.

Typically, in digital communication, frames or packets are used that are preceded by a header or preamble, which is followed by an information stream, i.e., the payload. The header and/or preamble is typically modulated using a robust modulation scheme to increase the probability of accurate transmission of the header. In order to increase the data transfer rate, the payload is typically modulated using a less robust modulation scheme, which may change depending on the link conditions.

If the received training sequence is positioned within the header, then the received training sequence is transmitted using the more robust modulation scheme of the header, which is more immune to the effects of the multi-path. The payload is typically modulated using a less robust modulation scheme, and therefore experiences more ISI than the header. Consequently, the receiver compares the reference training sequence with a received training sequence that is more immune to the effects of the multi-path, and therefore has experienced less ISI as compared to the payload. As a result, the equalizer receives insufficient information to accurately estimate the channel parameters with respect to the payload, where the equalization is applied.

Ideally, the received training sequence should be modulated using the modulation scheme of the payload, and the reference training sequence should be selected according to the modulation scheme of the payload.

Accordingly, there is a need to provide a method for training a radio receiver in which received training sequences are positioned, and reference training sequences are selected, to accurately reflect the modulation scheme applied to the payload, even where dynamic link adaptation is applied.

SUMMARY

The present invention addresses these and other concerns. According to one aspect, a method of training a radio receiver includes receiving an initial portion of a data packet at the receiver, the initial portion containing at least one flag to identify a corresponding reference training sequence to be selected by the receiver (i.e., based on a modulation scheme applied to the payload) and to indicate whether a training sequence is inserted in the data packet. The training sequence, when indicated, is positioned within the data packet at a midamble between the initial portion and a first segment portion of the data packet. The receiver compares the received training sequence with the selected reference training sequence and generates one or more correction signals based on the results of the comparison. The receiver adjusts equalization parameters of the receiver based on the one or more correction signals.

According to another aspect, a method of training a radio receiver includes receiving an initial portion of a data packet at the receiver, the initial portion containing a first flag to identify a corresponding reference training sequence to be selected by the receiver and a second flag to indicate whether a training sequence is inserted in the data packet. The training sequence, when indicated, is positioned within the data packet at a midamble between the initial portion and a first segment portion of the data packet. The receiver compares the received training sequence with the selected reference training sequence and generates one or more correction signals based on the results of the comparison. The receiver adjusts equalization parameters of the receiver based on the one or more correction signals.

According to yet another aspect, a method of compensating for distortion in a radio communication system utilizing link adaptation, such that a modulation scheme applied to data packets varies according to a link quality, includes inserting, at a transmitter, in an initial portion of a data packet to be transmitted, at least one flag to identify a corresponding reference training sequence to be selected by a receiver and to indicate whether a training sequence is inserted within the data packet. The transmitter inserts the training sequence within the data packet at a midamble between the initial portion and a first segment portion of the data packet. The receiver reads the at least one flag to determine a corresponding reference training sequence when the training sequence is indicated. The receiver compares the received training sequence with the reference training sequence selected at the receiver and generates one or more correction signals based on the results of the comparison. The receiver adjusts equalization parameters of the receiver based on the one or more correction signals.

According to yet another aspect, a trainable radio receiver includes a receiving section to receive an initial portion of a data packet at the receiver, the initial portion containing at least one flag to identify a corresponding reference training sequence to be selected by the receiver and to indicate whether a training sequence is inserted in the data packet. A processor of the receiver processes the training sequence at the receiver according to the at least one flag, the training sequence being positioned within the data packet at a midamble between the initial portion and a first segment portion of the data packet, to compare the received training sequence with a reference training sequence previously known to the receiver, and to generate one or more correction signals based on the results of the comparison. An equalizer adjusts equalization parameters of the receiver based on the one or more correction signals.

According to yet another aspect, a transmitter includes a processor operative to insert at least one flag to identify a corresponding reference training sequence to be selected by the receiver and indicate whether a training sequence is inserted within data packets to be transmitted, the processor inserting the training sequence at a midamble of the data packets between an initial portion and a first segment portion. A modulator operates to apply at least one modulation scheme to the data packets prior to transmission of the modulated data packets by a transmission means.

According to yet another aspect, a computer program product for controlling communication over a communication channel in a radio receiver includes a computer-readable storage medium having computer-readable program code means embodied in the medium. The computer-readable program code means includes logic that processes an initial portion of a data packet containing at least one flag to identify a corresponding reference training sequence to be selected by the receiver and to indicate whether a training sequence is inserted in the data packet. Additional logic is included that processes a received training sequence according to the at least one flag, the received training sequence being positioned within the data packet at a midamble between the initial portion and a first segment portion of the data packet, that compares the received training sequence with a previously known reference training sequence, and that adjusts equalization parameters of the receiver based on the results of the comparison.

BRIEF DESCRIPTION OF THE DRAWINGS

The objects, features, and advantages of this invention will be understood by reading this description in conjunction with the drawings, in which like reference numerals identify like parts, and in which:

FIG. 1 illustrates an example of a multi-path channel;

FIG. 2 illustrates an example of a channel impulse response of a multi-path channel;

FIG. 3 illustrates a communication system communicating using a data packet format according to an embodiment of the present invention;

FIGS. 4a–4d illustrate the application of a modulation scheme to a training sequence at a midamble according to embodiments of the present invention;

DETAILED DESCRIPTION

Figure 4B:
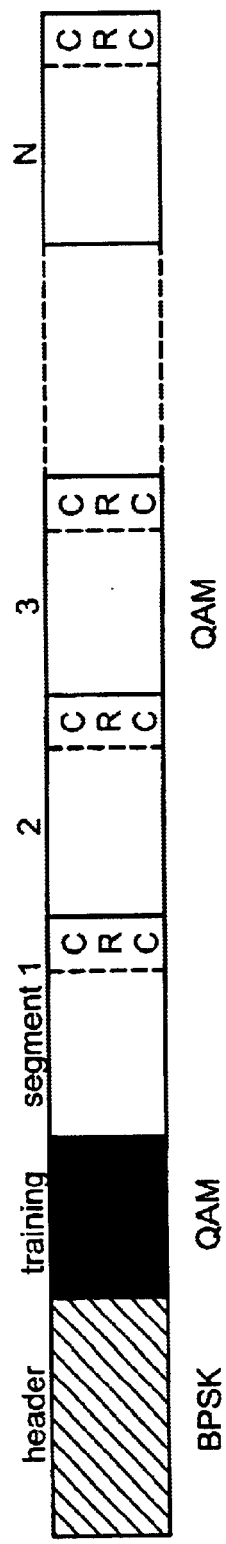

The invention provides a method and system for providing equalizer training in communication systems, including communication systems employing link adaptation. An equalizer includes numerous parameters that are adjusted on the basis of measurements of a channel's signal-affecting characteristics to correct or compensate for ISI.

A received training sequence is compared at the receiver with a stored, locally-generated, or otherwise known reference training sequence. The differences between the two sequences are used to set the equalizer parameters.

As described above, multi-path or dispersive interference in a channel is a result of reflections in the propagation path between a transmitter and a receiver. An example is shown in FIG. 1. The signal is transmitted at a transmission point 130 (i.e., an antenna) and arrives at a receiver destination 100 over multiple paths $d_1$, $d_2$, $d_3$, each traveling different distances, and therefore having different delays, different magnitudes and different phases. In FIG. 1, path $d_1$ is shorter than paths $d_2$ and $d_3$, which are reflected off obstacles 110 and 120, respectively. Obstacles may include buildings, trees, etc. If the delay spread between the signals is on the order of the symbol time, then ISI results. The echoes in the signal result in linear distortion, such as frequency selective fading. Although FIG. 1 illustrates a downlink receiving method and system, it will be understood by one of ordinary skill in the art that the present invention is equally applicable to an uplink receiving method and system.

The resultant distortion can be removed using equalizers to compensate for the effects of the multi-path or dispersive channel. To determine appropriate parameters for the equalizer, the delay, magnitude and phase of the different delayed signal components must be estimated. Usually, a channel model is based on a Finite Impulse Response (FIR) model which is sampled at the symbol rate. FIG. 2 shows the FIR model of the channel illustrated in FIG. 1. To determine the FIR model, the transmitter may send training sequences to the equalizer. Training sequences will vary according to the modulation scheme applied. For example, for a 64-QAM (quadrature amplitude modulation) modulation scheme, the training sequence will be more complex than for a binary BPSK (binary phase shift keying) modulation scheme. That is, the training sequence should contain sufficient magnitude and phase transitions of the applied modulation scheme in order to configure the equalizer properly.

Digital communication systems typically transmit information in packets or frames. For example in a recently filed provisional application entitled "Selective repeat automatic retransmission query (ARQ) protocol and/or ping pong protocol," filed on Feb. 3, 2000, which is incorporated by reference, a system is described which uses packets consisting of a header and a payload. The payload is divided into segments to facilitate a selective repeat ARQ procedure.

An example of a communication system communicating using a data packet format is illustrated in FIG. 3. A transmitter 300 transmits data packets to a receiver 310 in a predetermined format 330. The receiver 310 includes an equalizer that processes the received data packets and compensates for ISI. The header is modulated using a robust modulation scheme, for example DBPSK (differential binary phase shift keying) which is resistant both to noise and multi-path fading. The payload is modulated using a modulation scheme that may be different from the scheme applied to the header to provide higher data rates, for example QPSK (quadrature phase shift keying), 8-PSK (8-phase, phase shift keying), or QAM, to name a few. The modulation scheme applied to the payload is indicated by a flag contained in the header. The receiver 310 decodes the header to determine which demodulation scheme to use for decoding the payload. The modulation scheme(s) applied to the payload may be more sensitive to both noise and multi-path fading.

As discussed above, the receiver 310 receives a known training sequence in each packet that is inserted by the transmitter 300. The receiver 310 then compares the received training sequence bit pattern to a reference training sequence bit pattern and generates one or more correction signals corresponding to the differences between the reference training signal and the received training sequence. The one or more correction signals may be used to adjust the parameters of the equalizer 320, e.g., to produce an inverse transfer function to that of the radio path. Since the characteristics of the received training sequence will vary according to the modulation scheme applied, the received training sequence is modulated using the same modulation scheme that is used on the payload in the associated packet. The reference training sequence used is selected to correspond to the modulation scheme.

FIG. 4a depicts a data packet that includes a midamble following the header to train the equalizer 320 in the receiver 310. Placement of the received training sequence after the header provides several advantages. First, the modulation scheme applied to the midamble will be the same as that applied to the payload. Consequently, the equalizer 320 training will correspond to the modulation scheme of the payload, to which the equalization will be applied. Second, where link adaptation is applied, the equalizer training will remain current for each packet as the modulation scheme applied to the payload changes to adapt to link quality conditions.

Figure 4C:
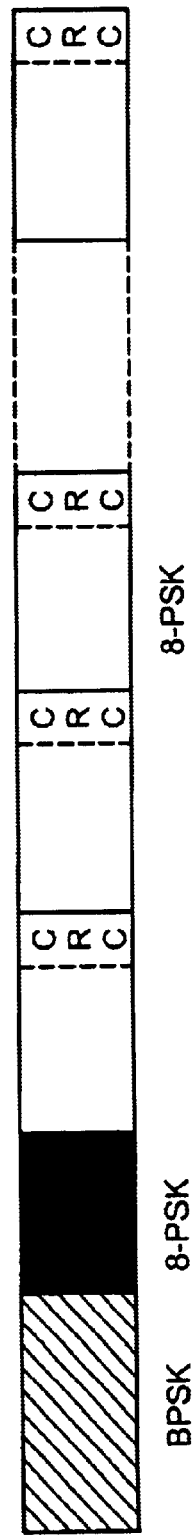
Figure 4D:
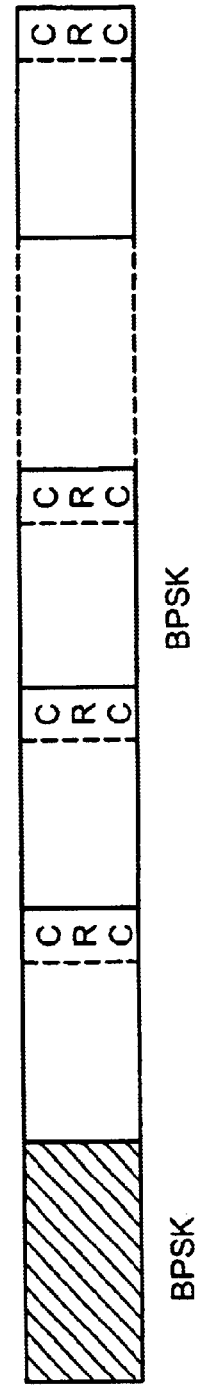

For example, in the embodiment illustrated by FIG. 4b, a QAM modulation scheme is applied to the payload. The received training sequence will therefore also have a QAM modulation scheme applied, and the reference training sequence used will correspond to the QAM modulation scheme. Similarly, in FIG. 4c, a 8-PSK modulation scheme is applied to the payload. The received training sequence will therefore also have an 8-PSK modulation scheme applied, and the reference training sequence used will correspond to the 8-PSK modulation scheme. FIG. 4d depicts the case where a robust modulation scheme (i.e., BPSK) that preempts the need for equalization is applied to the payload, such as the modulation schemes typically applied to headers. Consequently, no training sequence is inserted prior to transmission.

Figure 5:
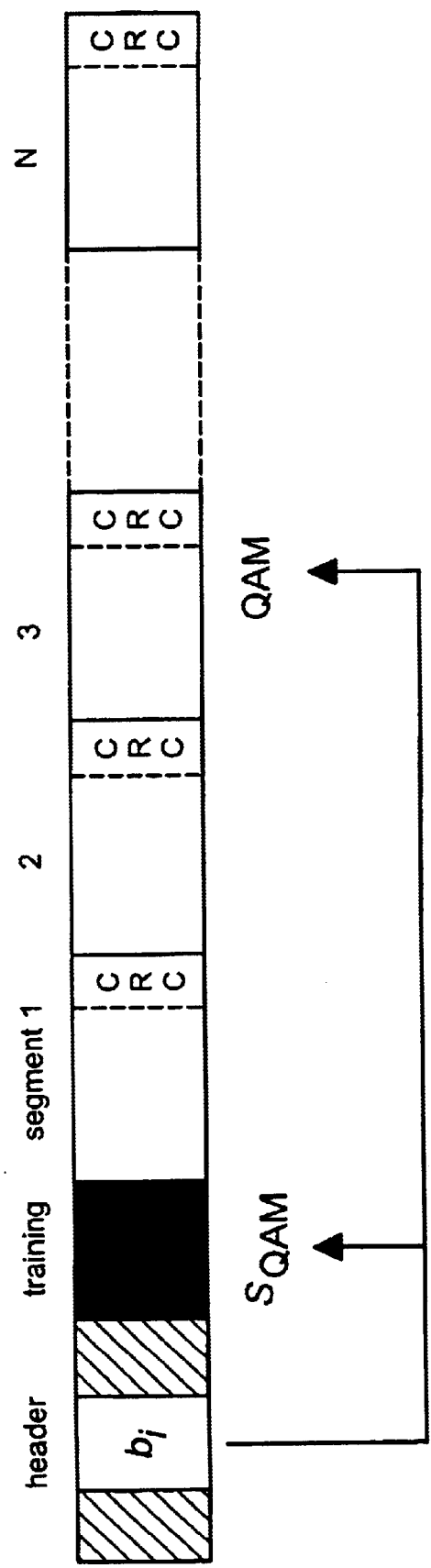
FIG. 5 illustrates a header format according to an embodiment of the present invention.

In FIG. 5, a preferable header format is illustrated. One field is preferably reserved for a flag $b_j$, which provides an indication to the receiver 310 to aid the receiver in selecting a corresponding reference training sequence. For example, flag $b_i$ may indicate which modulation scheme is applied to the payload. The receiver 310, upon decoding the header and determining that flag $b_i$, determines which reference training sequence to select (i.e., the one associated with the modulation scheme it has to train the equalizer 320 for). Flag $b_i$ may also indicate that no training sequence S is inserted prior to transmission. For example, when the payload is to be transmitted using a robust modulation scheme, such as BPSK, flag $b_i$ may so indicate. The receiver 310, upon decoding the header and determining that flag $b_i$ indicates a BPSK modulation scheme, determines that the transmitter 300 has omitted the training sequence S.

Figure 6:
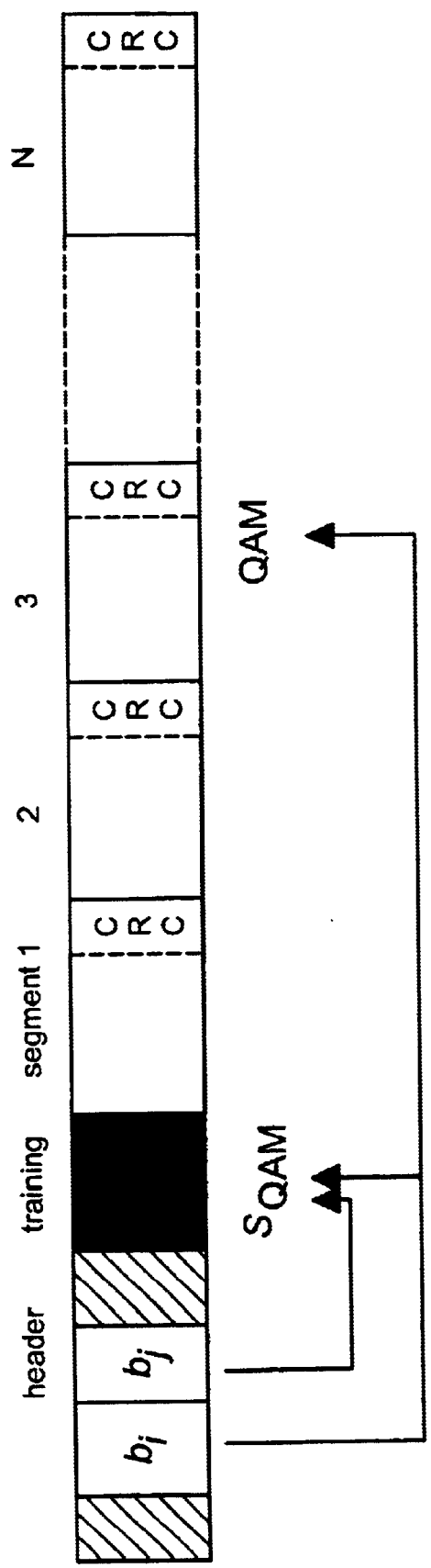
FIG. 6 illustrates a header format according to another embodiment of the present invention.

FIG. 6 depicts a case where an additional flag $b_i$ is used to indicate whether a training sequence is inserted by transmitter 300. Flag $b_i$ provides an indication to the receiver 310 to aid the receiver 310 in selecting a corresponding reference training sequence. Since not all channels may be dispersive, Flag $b_i$ may function independently of flag $b_i$ to provide an indication to the receiver that the training sequence is inserted. For example, where ISI is not detected at the receiver 310, the transmitter 300 may omit the training sequence altogether.

Figure 7:
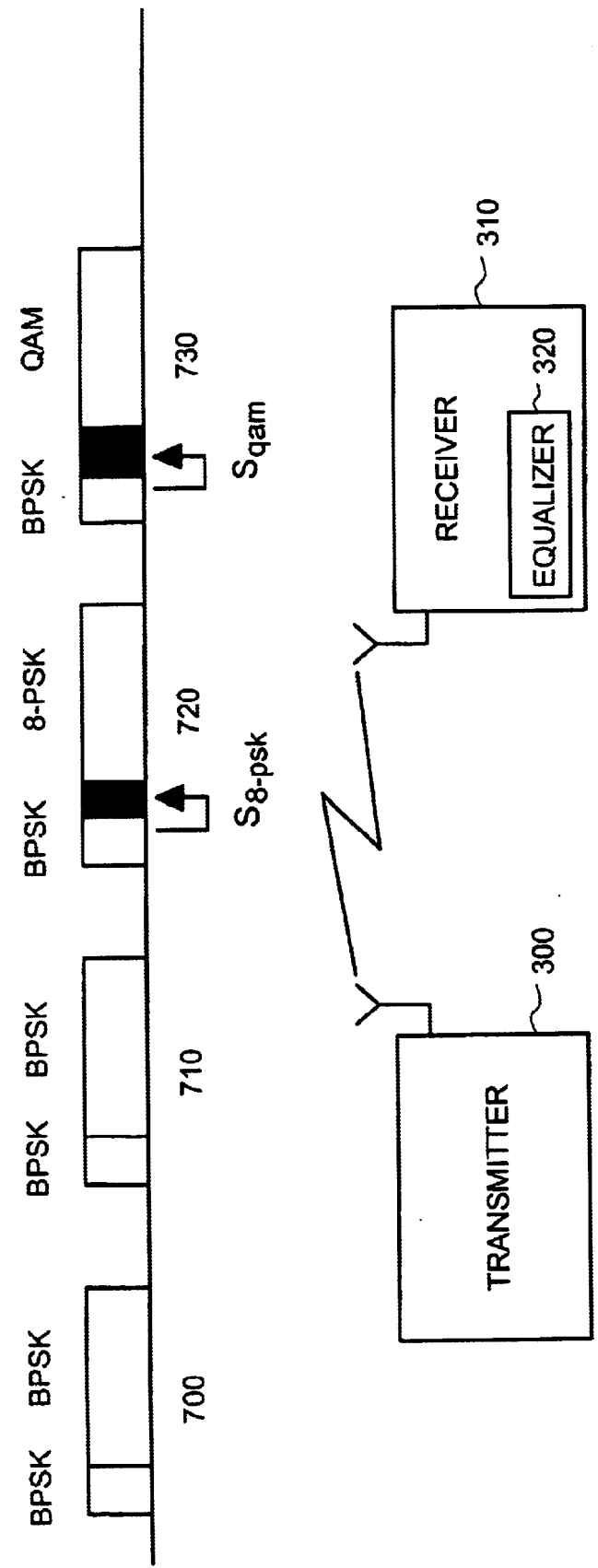
FIG. 7 illustrates training sequence insertion according to an embodiment of the present invention.

FIG. 7 illustrates a transmission method where link adaptation is applied. In FIG. 7, the transmitter 300 is switching between different modulation schemes to compensate for varying link performance. As the link performance degrades, a more robust modulation scheme is applied. Conversely, as the link performance improves, a less robust, higher data rate, modulation scheme is applied. The transmitter 300 inserts appropriate midambles corresponding to the current modulation scheme used. The receiver 310 may inform the transmitter 300 of the link performance via a return channel. The transmitter 300 determines based on the link performance whether a different modulation scheme should be applied to subsequent payloads to maintain a predetermined link quality level while maximizing the data rate. The receiver 310 may also inform the transmitter 300 via a return channel whether the channel is time dispersive such that a training sequence is required. The transmitter 300 determines whether to insert a training sequence based on the feedback provided by the receiver. Alternatively, the transmitter 300 may determine whether to insert a training sequence based on the modulation scheme being applied to the payload. When a robust modulation scheme, i.e., BPSK, is applied to the payload, the transmitter 300 may omit the training sequence.

As depicted in FIG. 7, the transmitter may transmit a first and second data packet 700, 710 with a BPSK modulation scheme applied to both the header and payload, thereby preempting the need for the transmitter 300 to insert a training sequence. The transmitter 300 may, to increase the data rate, begin transmitting data packets with a less robust modulation scheme applied to the payload, thereby providing higher data transfer rates. For example, a third data packet 720 has an 8-PSK modulation scheme applied to the midamble and payload. The transmitter 300 inserts a training sequence at a midamble of the data packet corresponding to 8-PSK. The transmitter 300 inserts one or more flags in the header to indicate that a training sequence is inserted and that an 8-PSK modulation scheme is applied to the midamble and payload. The receiver 310 demodulates the header to determine that a training sequence is inserted and selects a reference training sequence corresponding to the modulation scheme applied to the payload. Similarly, a fourth data packet 730 has a QAM modulation scheme applied to the midamble and payload. The transmitter 300 inserts a training sequence at a midamble of the data packet corresponding to QAM. The transmitter 300 inserts one or more flags in the header to indicate that a training sequence is inserted and that a QAM modulation scheme is applied to the midamble and payload. The receiver 310 demodulates the header to determine that a training sequence is inserted and selects a reference training sequence corresponding to the modulation scheme applied to the payload. In each case, the receiver 310 compares the received training sequence bit pattern to a reference training sequence bit pattern and generates one or more correction signals corresponding to the differences between the reference training signal and the received training sequence. The one or more correction signals may be used to adjust the parameters of the equalizer 320.

An exemplary method of training a radio receiver 310 is further illustrated with reference to FIG. 8. A receiver 310 processes received packets during radio communication. As each packet is received, the associated header is processed (step 810). One or more flags in the header are read to determine the flag indications (step 820), i.e., what the associated modulation scheme is and whether a training sequence is inserted by the transmitter 300. If it is determined that no training sequence is inserted (step 830), then the payload for the packet is processed (step 870). However, when a training sequence is indicated by the flag(s) (step 830), the receiver 310 selects a reference training sequence according to the flag indication (step 840). The reference training sequence may be generated locally, retrieved from a memory, or known to the receiver 310 by some other means. The receiver 310 compares the received training sequence bit pattern to the reference training sequence bit pattern and generates one or more correction signals corresponding to the differences between the reference training signal and the received training sequence (step 850). The one or more correction signals may be used to adjust the parameters of the equalizer 320 (step 860), i.e., to produce an inverse transfer function to that of the radio path. The receiver 310 processes the payload of the packet applying the equalization parameters (step 870). The receiver 310 then processes the next packet, repeating the procedure above.

Figure 8:
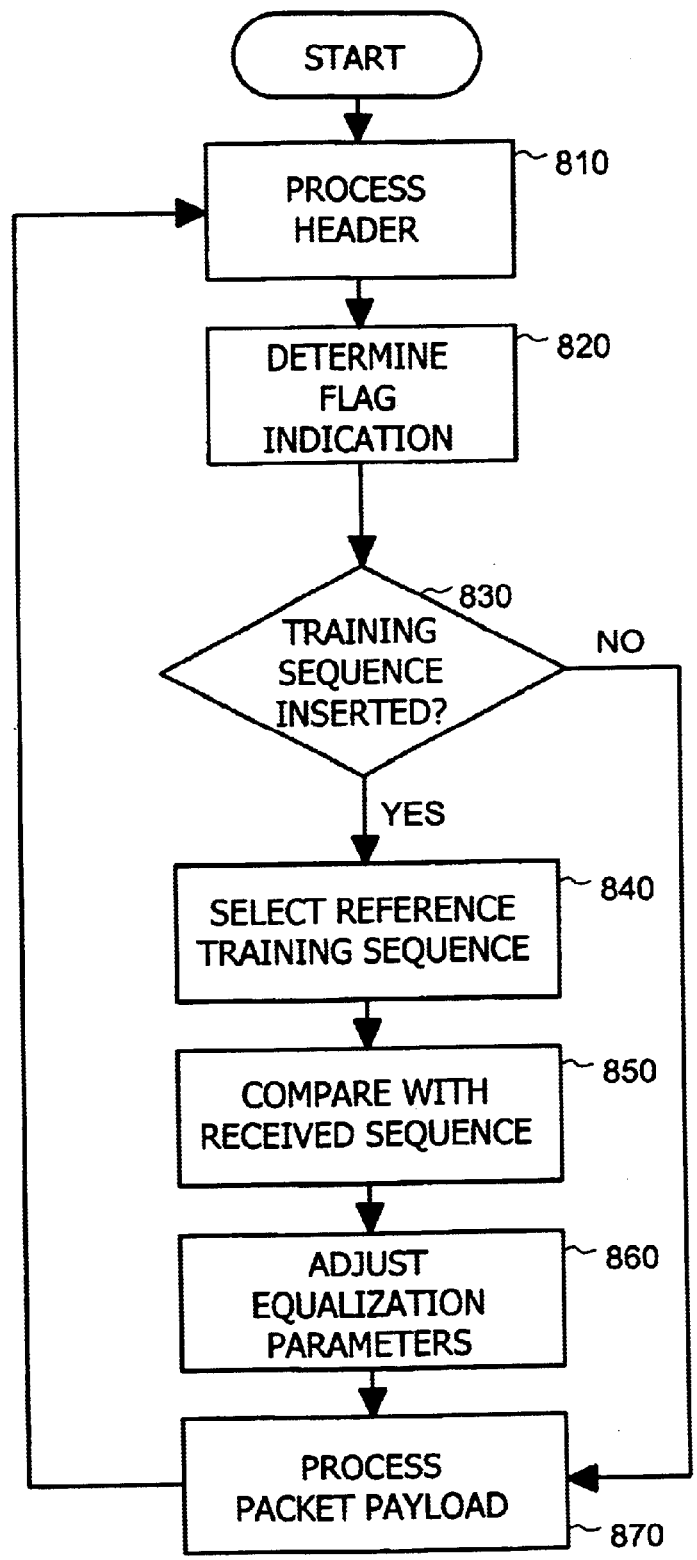
FIG. 8 is a flow chart illustrating a method according to an embodiment of the present invention.

It will be appreciated that the steps of the methods illustrated in FIG. 8 can be readily implemented either by software that is executed by a suitable processor in the receiver 310 or by hardware, such as an application-specific integrated circuit (ASIC), provided in the receiver 310.

Although described with reference to a communication system, it will be appreciated by those of ordinary skill in the art that this invention can be embodied in other specific forms without departing from its essential character. For example, the invention may be used in any multi-processor system. The embodiments described above should therefore be considered in all respects to be illustrative and not restrictive.

The various aspects of the invention have been described in connection with a number of exemplary embodiments. To facilitate an understanding of the invention, many aspects of the invention were described in terms of sequences of actions that may be performed by elements of a computer system. For example, it will be recognized that in each of the embodiments, the various actions could be performed by specialized circuits (e.g., discrete logic gates interconnected to perform a specialized function), by program instructions being executed by one or more processors, or by a combination of both.

Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

It should be emphasized that the terms "comprises" and "comprising", when used in this specification as well as the claims, are taken to specify the presence of stated features, steps or components; but the use of these terms does not preclude the presence or addition of one or more other features, steps, components or groups thereof.

Various embodiments of Applicants' invention have been described, but it will be appreciated by those of ordinary skill in this art that these embodiments are merely illustrative and that many other embodiments are possible. The intended scope of the invention is set forth by the following claims, rather than the preceding description, and all variations that fall within the scope of the claims are intended to be embraced therein.

What is claimed is:

1. A method of training a radio receiver, comprising the steps of:

receiving an initial portion of a data packet at the receiver, the initial portion containing at least one flag to identify a corresponding reference training sequence to be selected by the receiver and to indicate whether a training sequence is inserted in the data packet;

receiving the training sequence at the receiver according to the at least one flag, the training sequence being positioned within the data packet at a midamble between the initial portion and a first segment of the data packet;

comparing, at the receiver, the received training sequence with the selected reference training sequence; and generating one or more correction signals based on the results of the comparison, wherein the initial portion is received having a first modulation scheme applied and the midamble is received having a second modulation scheme applied, the second modulation scheme also being applied to the first segment, and any subsequent segments received within the data packet.

2. The method of claim 1, comprising the additional step of:

adjusting equalization parameters of the receiver based on the one or more correction signals.

3. The method of claim 1, wherein the at least one flag indicates a modulation scheme applied to the first segment, and any subsequent segments received within the data packet.

4. The method of claim 1, wherein the at least one flag is one modulation flag indicating a modulation scheme applied to the first segment, and any subsequent segments received within the data packet.

5. The method of claim 1, wherein the second modulation scheme is less robust than the first modulation scheme.

6. A method of training a radio receiver, comprising the steps of:

receiving an initial portion of a data packet at the receiver, the initial portion containing a first flag to identify a corresponding reference training sequence to be selected by the receiver and a second flag to indicate whether a training sequence is inserted in the data packet;

receiving the training sequence at the receiver according to the first and second flags, the training sequence being positioned within the data packet at a midamble between the initial portion and a first segment of the data packet;

comparing, at the receiver, the received training sequence with the selected reference training sequence; and generating one or more correction signals based on the results of the comparison, wherein the initial portion is received having a first modulation scheme applied and the midamble is received having a second modulation scheme applied, the second modulation scheme also being applied to the first segment, and any subsequent segments received within the data packet.

7. The method of claim 6, comprising the additional step of:

adjusting equalization parameters of the receiver based on the one or more correction signals.

8. The method of claim 6, wherein the first flag indicates a modulation scheme applied to the first segment, and any subsequent segments received within the data packet.

9. A method of compensating for distortion in a radio communication system utilizing link adaptation, such that a modulation scheme applied to data packets varies according to a link quality, the method comprising the steps of:

inserting, at a transmitter, in an initial portion of a data packet to be transmitted, at least one flag to identify a corresponding reference training sequence to be selected by a receiver and to indicate whether a training sequence is inserted within the data packet;

inserting, at the transmitter, when the training sequence is indicated, the training sequence within the data packet at a midamble between the initial portion and a first segment of the data packet;

receiving the initial portion of a packet at the receiver and reading the at least one flag to determine a corresponding reference training sequence when the training sequence is indicated;

receiving the training sequence at the receiver and comparing the received training sequence with the reference training sequence selected at the receiver; and generating one or more correction signals based on the results of the comparison, wherein the initial portion is transmitted having a first modulation scheme applied and the midamble is transmitted having a second modulation scheme applied, the second modulation scheme also being applied to the first segment, and any subsequent segments transmitted within the data packet.

10. The method of claim 9, comprising the additional step of: adjusting equalization parameters of the receiver based on the one or more correction signals.

11. The method of claim 9, wherein the at least one flag indicates a modulation scheme applied to the first segment, and any subsequent segments transmitted within the data packet.

12. The method of claim 9, wherein the second modulation scheme is less robust than the first modulation scheme.

13. A trainable radio receiver comprising:

a receiving section to receive an initial portion of a data packet at the receiver, the initial portion containing at least one flag to identify a corresponding reference training sequence to be selected by the receiver and to indicate whether a training sequence is inserted in the data packet; and a processor to process the training sequence at the receiver according to the at least one flag, the training sequence being positioned within the data packet at a midamble between the initial portion and a first segment of the data packet, to compare the received training sequence with a reference training sequence previously known to the receiver, and to generate one or more correction signals based on the results of the comparison, wherein the initial portion is received having a first modulation scheme applied and the midamble is received having a second modulation scheme applied, the second modulation scheme also being applied to the first segment, and any subsequent segments received within the data packet.

14. The receiver of claim 13, further comprising an equalizer to adjust equalization parameters of the receiver based on the one or more correction signals.

15. The receiver of claim 13, wherein the at least one flag indicates a modulation scheme applied to the first segment, and any subsequent segments received within the data packet.

16. The receiver of claim 13, wherein the second modulation scheme is less robust than the first modulation scheme.

17. A transmitter comprising:

a processor operative to insert at least one flag to identify a corresponding reference training sequence to be selected by the receiver and to indicate whether a training sequence is inserted within data packets to be transmitted, the processor inserting the training sequence at a midamble of the data packets between an initial portion and a first segment a modulator operative to apply at least one modulation scheme to the data packets prior to transmission; and transmission means to transmit the modulated data packets, wherein the initial portion is transmitted having a first modulation scheme applied, and the midamble is transmitted having a second modulation scheme applied, the second modulation scheme also being applied to the first segment, and any subsequent segments received within the data packet.

18. The transmitter of claim 17, wherein the at least one flag indicates a modulation scheme applied to the first segment, and any subsequent segments transmitted within the data packet.

19. The transmitter of claim 17, wherein the second modulation scheme is less robust than the first modulation scheme.

20. A computer program product for controlling communication over a communication channel in a radio receiver, the computer program product comprising:
   a computer-readable storage medium having computer-readable program code means embodied in said medium, said computer-readable program code means including:
      logic that processes an initial portion of a data packet containing at least one flag to identify a corresponding reference training sequence to be selected by the receiver and to indicate whether a training sequence is inserted in the data packet;
      logic that processes a received training sequence according to the at least one flag, the received training sequence being positioned within the data packet at a midamble between the initial portion and a first segment portion of the data packet;
      logic that compares the received training sequence with a previously known reference training sequence; and
      logic that adjusts equalization parameters of the receiver based on the results of the comparison,
      wherein the initial portion is received by the receiver having a first modulation scheme applied and the midamble is received and processed having a second modulation scheme applied, the second modulation scheme also being applied to the first segment, and any subsequent segments received within the data packet.

21. The computer program product of claim 20, wherein the at least one flag indicates a modulation scheme applied to the first segment, and any subsequent segments received within the data packet.

22. The computer program product of claim 20, wherein the second modulation scheme is less robust than the first modulation scheme.

* * * * *